US012459008B2

(12) United States Patent
Hayes

(10) Patent No.: US 12,459,008 B2
(45) Date of Patent: Nov. 4, 2025

(54) ONE PIECE HIGH TEMPERATURE WASHER

(71) Applicant: Raytheon Technologies Corporation, Farmington, CT (US)

(72) Inventor: Raymond Hayes, Newington, CT (US)

(73) Assignee: RTX Corporation, Farmington, CT (US)

( * ) Notice: Subject to any disclaimer, the term of this patent is extended or adjusted under 35 U.S.C. 154(b) by 200 days.

(21) Appl. No.: 18/143,135

(22) Filed: May 4, 2023

(65) Prior Publication Data

US 2023/0381827 A1 Nov. 30, 2023

Related U.S. Application Data

(60) Provisional application No. 63/345,625, filed on May 25, 2022.

(51) Int. Cl.
*B08B 3/02* (2006.01)
*B08B 5/02* (2006.01)
*B08B 13/00* (2006.01)

(52) U.S. Cl.
CPC .................. *B08B 3/02* (2013.01); *B08B 5/02* (2013.01); *B08B 13/00* (2013.01); *B08B 3/022* (2013.01);
(Continued)

(58) Field of Classification Search
CPC .. B08B 5/02; B08B 13/00; B08B 3/02; B08B 3/022; B08B 2203/0282; B08B 2203/007; B08B 2203/0211
See application file for complete search history.

(56) References Cited

U.S. PATENT DOCUMENTS 3,050,211 A * 8/1962 Hutterer .................. D06F 37/28 220/252
5,095,927 A * 3/1992 Thompson ................ B08B 3/02 134/155
(Continued)

FOREIGN PATENT DOCUMENTS

CN 208223002 U * 12/2018
CN 109622470 A 4/2019
(Continued)

OTHER PUBLICATIONS

European Search Report issued Nov. 2, 2023 in counterpart EP Application No. 23174801.3.
(Continued)

*Primary Examiner* — Benjamin L Osterhout
(74) *Attorney, Agent, or Firm* — Bachman & LaPointe, P.C.

(57) ABSTRACT

A washer including a cabinet with a washing zone accessible through a doorway; a door with an inflatable door seal for sealing the doorway, the door seal coupled to a pneumatic air system; a clamp for securing a part within the washing zone; a wash nozzle and air nozzle are located within the washing zone and fluidly coupled to a process water system, pneumatic system respectively for washing and drying the part; a safety controller operatively coupled to the door, the pneumatic system and the process water system; and a process controller operatively coupled to the door, the pneumatic system, the process water system and the clamp, the process controller configured to wash the part.

20 Claims, 3 Drawing Sheets

(52) U.S. Cl.
CPC . *B08B 2203/007* (2013.01); *B08B 2203/0211* (2013.01); *B08B 2203/0282* (2013.01)

(56) References Cited

U.S. PATENT DOCUMENTS

| | | | | | |
|---|---|---|---|---|---|
| 5,221,360 | A * | 6/1993 | Thompson | B08B 3/02 | 134/32 |
| 5,882,589 | A * | 3/1999 | Mariotti | B08B 3/102 | 422/267 |
| 6,158,450 | A | 12/2000 | Painter | | |
| 6,550,489 | B1 | 4/2003 | Yates | | |
| 8,919,360 | B1 * | 12/2014 | Ransley | B08B 3/02 | 134/198 |

FOREIGN PATENT DOCUMENTS

| | | | | |
|---|---|---|---|---|
| EP | 292090 | A * | 11/1988 | B08B 3/02 |
| EP | 3450035 | A1 * | 3/2019 | A01K 1/031 |
| KR | 102143722 | B1 | 8/2020 | |
| WO | WO-9949122 | A1 * | 9/1999 | D06F 37/28 |
| WO | WO2001/56615 | A2 | 8/2001 | |
| WO | WO2020/078562 | A1 | 4/2020 | |

OTHER PUBLICATIONS

Communication pursuant to Article 94(3) EPC for counterpart EP Application No. 23174801.3 dated Jul. 31, 2025.
Gae Smith “Turbine blades and gas turbine segments”, PBS Group, Dec. 31, 2017.

* cited by examiner

ONE PIECE HIGH TEMPERATURE WASHER

CROSS-REFERENCE TO RELATED APPLICATION

This application claims the benefit of provisional application Ser. No. 63/345,625 filed May 25, 2022.

BACKGROUND

The present disclosure is directed to the improved high temperature washer.

During production of airfoils for gas turbine engines the parts are precision ground utilizing computer numerical control (CNC) grinders. CNC grinding machines are machine tools which use a rotating grinding wheel to achieve material removal on a metallic workpiece by means of cutting. The CNC grinding machines utilize oil based coolant.

Cutting fluid is a type of coolant and lubricant designed specifically for metalworking processes, such as machining and stamping. There are various kinds of cutting fluids, which include oils, oil-water emulsions, pastes, gels, aerosols (mists), and air or other gases. Cutting fluids are made from petroleum distillates, animal fats, plant oils, water and air, or other raw ingredients. Depending on context and on which type of cutting fluid is being considered, it may be referred to as cutting fluid, cutting oil, cutting compound, coolant, or lubricant.

The oil based lubricant used in blade fabrication deposits an oily residue on the part after the machining operation. Before the part can be further processed, the part must be cleaned to remove the oily residue and any other contaminants. The oily residue can interfere with certain manufacturing processes that occur after machining. The oily contaminants have precipitated unacceptable levels of scrap, rework and process delays.

Traditional parts cleaning machines have been limited to hot water temperatures below 120 degrees Fahrenheit and presented a variety of safety concerns for equipment operators.

What is needed is an improved parts cleaning machine that operates at water temperatures above 120 F and includes programmable logic controllers that increase the level of safety in the parts cleaning machine.

SUMMARY

In accordance with the present disclosure, there is provided a washer comprising a cabinet defining an interior and an exterior; a washing zone within the cabinet interior; the cabinet having a doorway operatively coupled to the washing zone; a door coupled to the exterior of the cabinet within linear motion guides coupled to the exterior, the door configured to open and close the doorway; a door seal coupled to the cabinet exterior proximate the doorway and operatively coupled to the door for sealing the doorway, the door seal comprising an inflatable bladder fluidly coupled to a pneumatic air system; a clamp located within the washing zone, the clamp configured to secure a part within the washing zone; a wash/air nozzle located within the washing zone and fluidly coupled to a process water system, the wash nozzle configured to direct process water toward the part, the wash/air nozzle fluidly coupled to the pneumatic system, the wash/air nozzle configured to direct air toward the part; a safety controller operatively coupled to the door, the pneumatic system and the process water system; and a process controller operatively coupled to the door, the pneumatic system, the process water system and the clamp, the process controller configured to wash the part.

A further embodiment of any of the foregoing embodiments may additionally and/or alternatively include the clamp comprises internal passages fluidly coupled to the process water system and pneumatic system, wherein process water is configured fluidly coupled to internal channels of the part and pneumatic system air is configured fluidly coupled to the internal channels responsive to the safety controller and process controller.

A further embodiment of any of the foregoing embodiments may additionally and/or alternatively include the clamp includes a rotary joint that is configured to couple a rotary drive with the clamp, the rotary drive configured to rotate the clamp such that the part is exposed on all sides to the wash nozzle located within the washing zone.

A further embodiment of any of the foregoing embodiments may additionally and/or alternatively include the washer further comprising an actuator coupled to the door, the actuator fluidly coupled to the pneumatic system, wherein the actuator opens and closes the door; and a mechanical brake operatively coupled to the actuator, the mechanical brake configured to prevent the door from moving responsive to the safety controller.

A further embodiment of any of the foregoing embodiments may additionally and/or alternatively include the washer further comprising air pressure sensors comprising a first door seal air pressure sensor and a second door seal air pressure sensor operatively coupled to the door seal, wherein the air pressure sensors are operatively coupled to the safety controller and configured to indicate door seal air pressure.

A further embodiment of any of the foregoing embodiments may additionally and/or alternatively include the washer further comprising a dual channel door switch operatively coupled to the door, the dual channel door switch configured to provide a control signal to the safety controller and indicate door position.

A further embodiment of any of the foregoing embodiments may additionally and/or alternatively include the washer further comprising a water tank located at the interior of the cabinet and fluidly coupled to the process water system and the washing zone; the water tank comprising an oil skimmer fluidly coupled to an oil coalescer.

In accordance with the present disclosure, there is provided a washer comprising a cabinet with a washing zone accessible through a doorway; a door with an inflatable door seal for sealing the doorway, the door seal coupled to a pneumatic air system; a clamp for securing a part within the washing zone; a wash/air nozzle located within the washing zone and fluidly coupled to a process water system and a pneumatic system for washing and drying the part; a safety controller operatively coupled to the door, the pneumatic system and the process water system; and a process controller operatively coupled to the door, the pneumatic system, the process water system and the clamp, the process controller configured to wash the part.

A further embodiment of any of the foregoing embodiments may additionally and/or alternatively include the clamp comprises internal passages fluidly coupled to the process water system and pneumatic system; and wherein the clamp includes a rotary joint that is configured to couple a rotary drive with the clamp.

A further embodiment of any of the foregoing embodiments may additionally and/or alternatively include the washer further comprising an actuator coupled to the door, the actuator fluidly coupled to the pneumatic system, wherein the actuator opens and closes the door; and a mechanical brake operatively coupled to the actuator, the mechanical brake configured to prevent the door from moving responsive to the safety controller.

A further embodiment of any of the foregoing embodiments may additionally and/or alternatively include the washer further comprising air pressure sensors comprising a first door seal air pressure sensor and a second door seal air pressure sensor operatively coupled to the door seal, wherein the air pressure sensors are operatively coupled to the safety controller and configured to indicate door seal air pressure.

A further embodiment of any of the foregoing embodiments may additionally and/or alternatively include the washer further comprising a dual channel door switch operatively coupled to the door, the dual channel door switch configured to provide a control signal to the safety controller and indicate door position.

A further embodiment of any of the foregoing embodiments may additionally and/or alternatively include the washer further comprising a water tank located at an interior of the cabinet and fluidly coupled to the process water system and the washing zone; the water tank comprising an oil skimmer fluidly coupled to an oil coalescer.

In accordance with the present disclosure, there is provided a process for washing a part with a washer comprising accessing a washing zone located within an interior of a cabinet of the washer securing a part to a clamp positioned within the washing zone; closing a door over a doorway that accesses the washing zone; securing the door with a door seal; preventing the door from opening responsive to signals from air pressure sensors and a door switch; washing the part with process water through at least one of a wash/air nozzle within the washing zone and internal passages within the clamp directed into internal channels of the part; and drying the part with air from a pneumatic system fluidly coupled to the wash/air nozzle directed toward the part and the internal passages within the clamp directed into the internal channels of the part.

A further embodiment of any of the foregoing embodiments may additionally and/or alternatively include the process further comprising securing the door in an open position employing a brake operatively coupled to an actuator coupled to the door and configured to lift the door open.

A further embodiment of any of the foregoing embodiments may additionally and/or alternatively include the process further comprising operatively coupling a safety controller to the door via the air pressure sensors and the door switch, the pneumatic system and the process water system; and operatively coupling a process controller to the door via the air pressure sensors and the door switch, the pneumatic system, the process water system and the clamp, the process controller configured to wash the part.

A further embodiment of any of the foregoing embodiments may additionally and/or alternatively include the process controller is configured with a human machine interface providing engineering control of process parameters.

A further embodiment of any of the foregoing embodiments may additionally and/or alternatively include the process further comprising preventing the actuation of the wash nozzle responsive to failure of the door seal as indicated from at least one of the air pressure sensors and the door switch.

A further embodiment of any of the foregoing embodiments may additionally and/or alternatively include the process further comprising preventing the actuation of the air nozzle responsive to failure of the door seal as indicated from at least one of the air pressure sensors and the door switch.

A further embodiment of any of the foregoing embodiments may additionally and/or alternatively include the process further comprising fluidly coupling a water tank located at an interior of the cabinet to the process water system and the washing zone; and fluidly coupling the water tank comprising an oil skimmer to an oil coalescer.

Other details of the high temperature washer are set forth in the following detailed description and the accompanying drawings wherein like reference numerals depict like elements.

DETAILED DESCRIPTION

Figure 1:
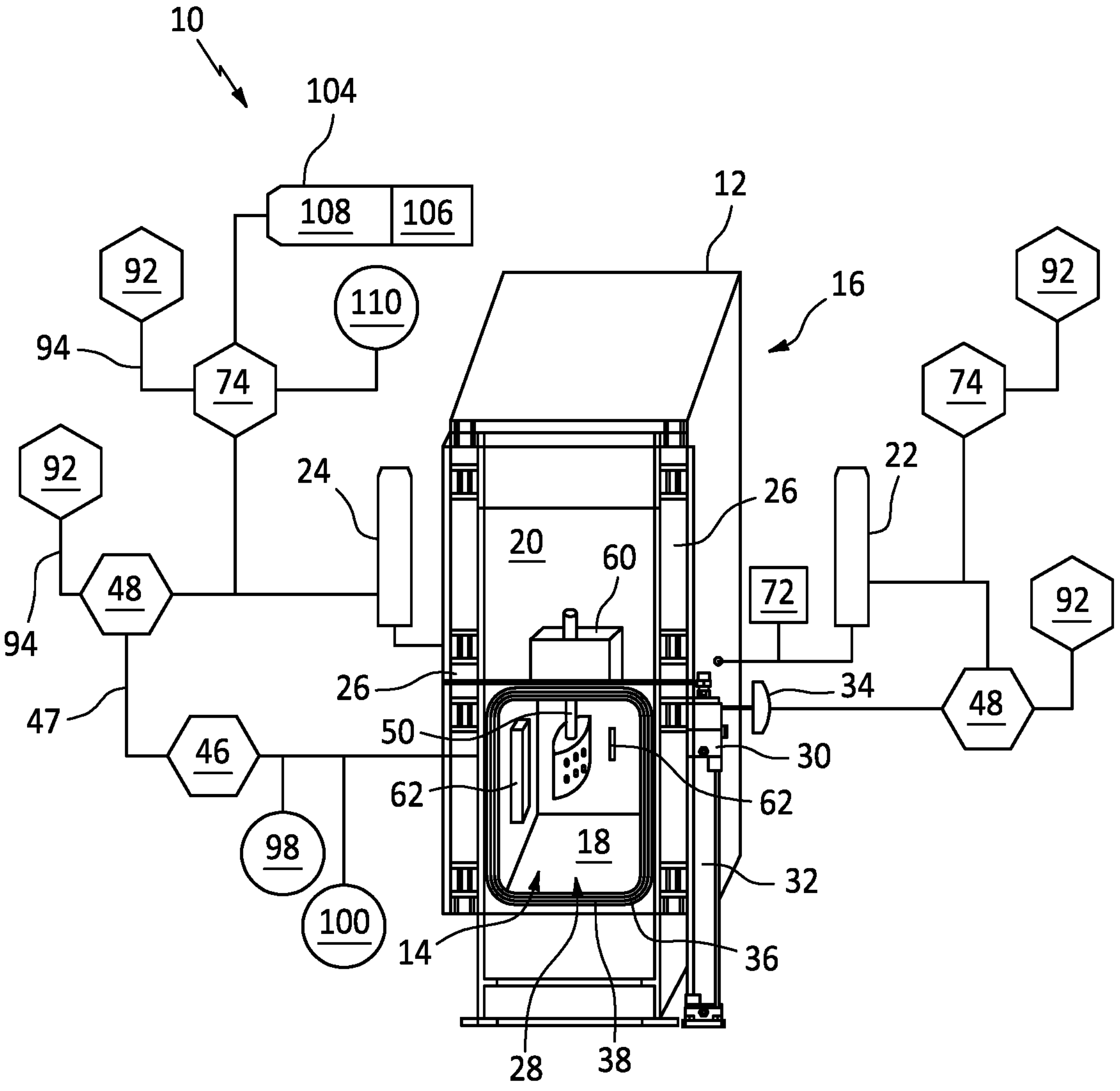
FIG. 1 is an isometric schematic representation of an exemplary part washing machine.
Figure 2:
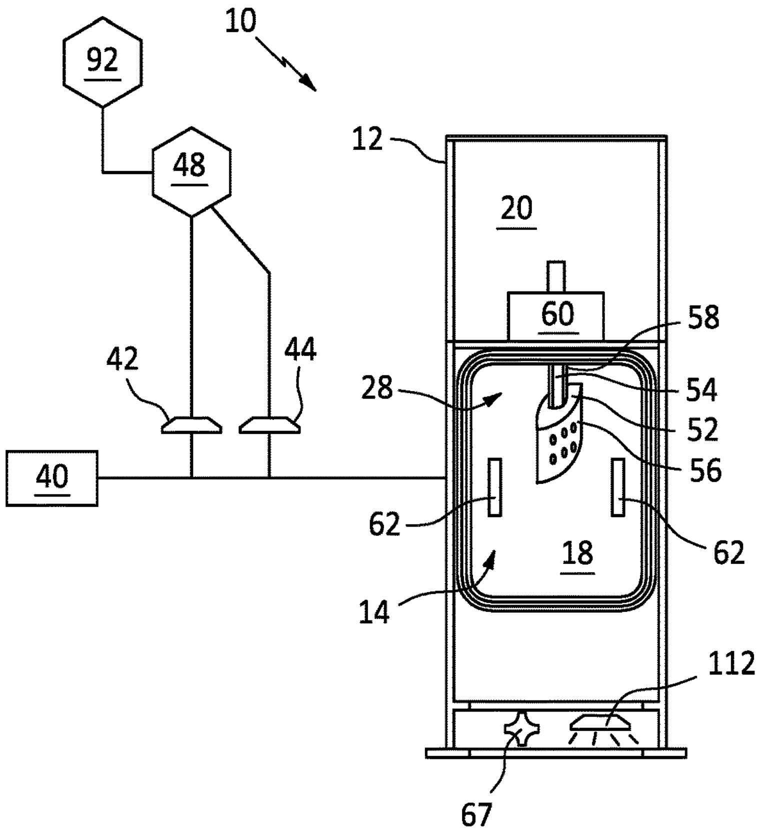
FIG. 2 is a front view schematic representation of the exemplary part washing machine.
Figure 3:
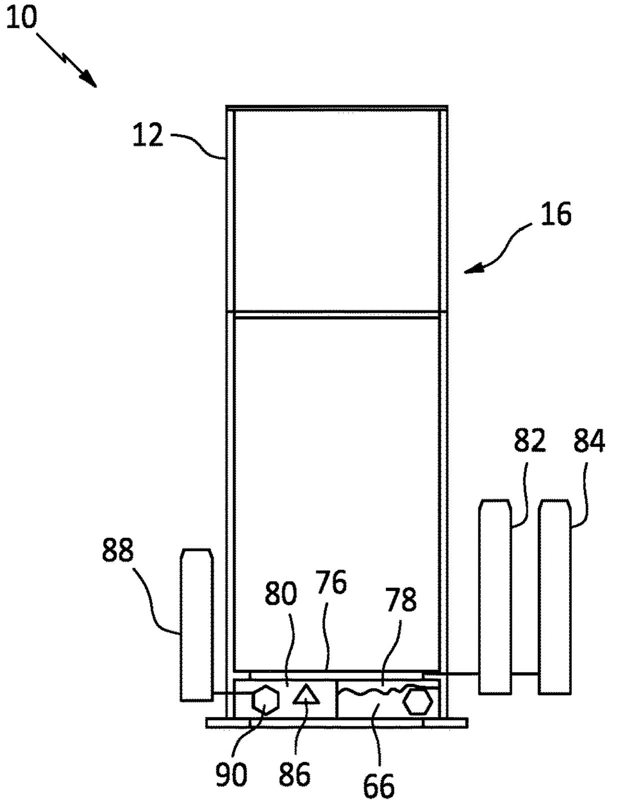
FIG. 3 is a side view schematic representation of the exemplary part washing machine.

Referring now to FIGS. 1 through 4, there is illustrated at FIG. 1 an isometric, at FIG. 2 front and FIG. 3 side views respectively of the exemplary high temperature washing machine or simply washer 10. The washer can include a cabinet 12. The cabinet 12 can include an interior 14 and an exterior 16. The cabinet 12 includes a washing zone 18 within the interior 14.

Access to the washing zone 18 is controlled by use of a door 20. The door 20 is configured to protect the operators (not shown) from the thermal hazard of hot process water 22 and energized pneumatic system 24 components within the washing zone 18. The door 20 can be a one inch thick Lexan™ plate or equivalent. The door 20 can be transparent allowing an operator to view the processes within the washing zone 18. The door 20 can be supported on the exterior 16 of the cabinet 12 with linear motion guides 26 located on opposite sides of a doorway 28 that provides access from the exterior 16 into the interior 14.

Figure 4:
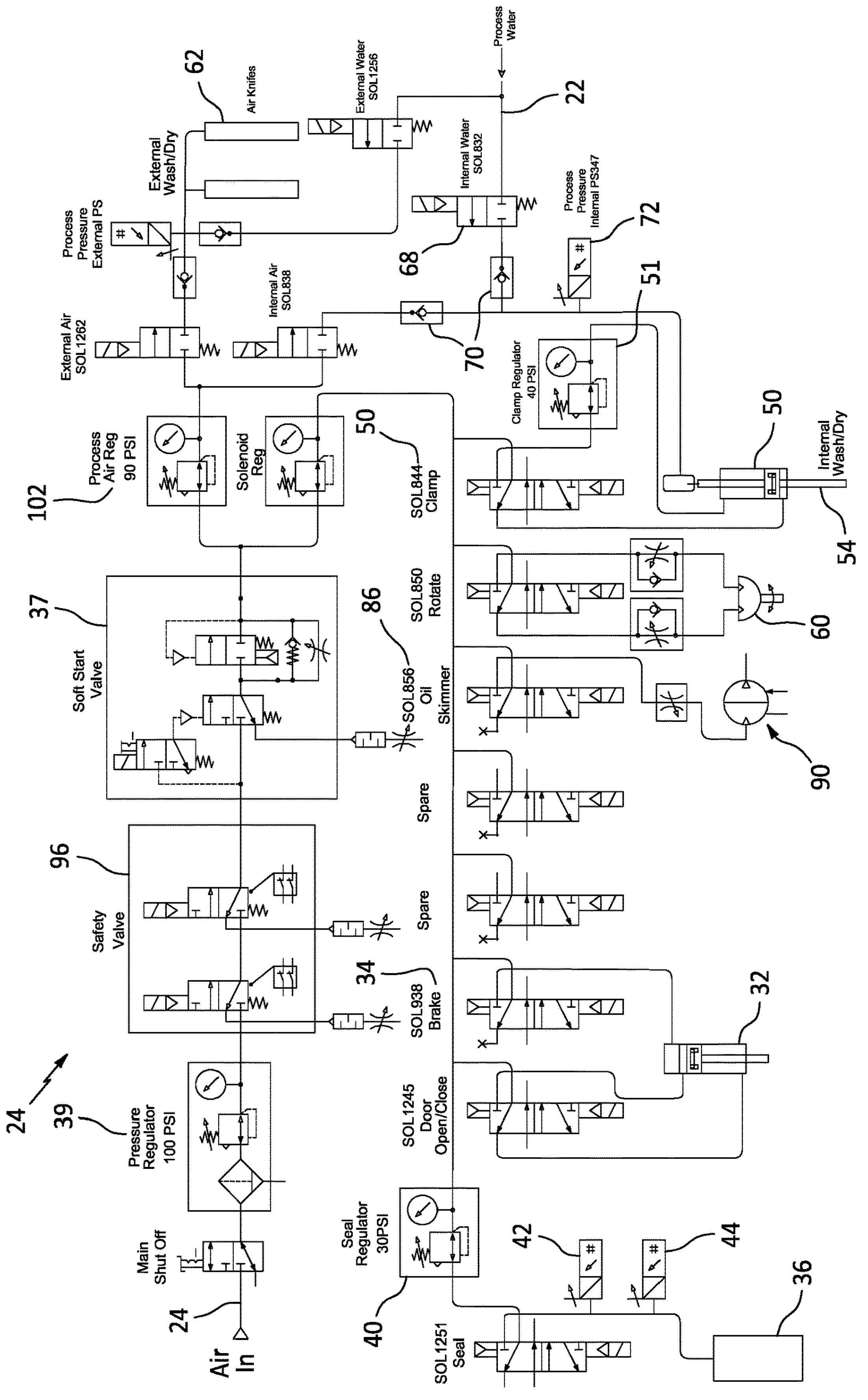
FIG. 4 is a schematic of the pneumatic system supply for the exemplary part washing machine.

An actuator 30 can be coupled to the door 20. The actuator 30 raises and lowers the door 20 in the linear motion guides 26. In an exemplary embodiment, the actuator can include a pneumatic cylinder 32 energized by the pneumatic system 24. A mechanical brake 34 can be coupled to the pneumatic cylinder 32 for physically securing the actuator 30 to prevent unwanted operation. The mechanical brake 34 can operate to engage the pneumatic cylinder 32 and prevent unwanted door 20 actuation on a loss of air pressure from the pneumatic air system 24. A soft start valve 37 can be utilized in the pneumatic air system 24 along with pressure regulators 39 as seen in FIG. 4, to bring the air pressure on-line.

The door 20 can be held open with positive actuation of the actuator 30 by use of air pressure in the pneumatic cylinder 32. The pneumatic cylinder 32 extends to lift the door 20 up and open. The door 20 closes upon retraction of the pneumatic cylinder 32. The mechanical brake 34 can be engaged to prevent the door 20 from dropping with a loss of air pressure. The pneumatic cylinder 32 has continuous pressure in the up or down position locking pneumatic cylinder 32 in place and preventing anyone from being able to open or move the door 20 at all. If air were to fail the mechanical brake 34 can engage due to the low air pressure alarm initiated responsive to low pressure.

A door seal 36 is located proximate the doorway 28 and configured to engage the door 20. The door seal 36 expands to seal against the inside surfaces of the door 20 around the doorway 28. The door seal 36 can include an inflatable bladder 38 that encircles the doorway 28 for a complete watertight seal against the door 20. The door seal 36 can be energized by the pneumatic system 24. The door seal 36 also acts to physically restrain the door 20 preventing the door 20 from being opened, especially during operation of the washer 10. The door seal 36 engages the door 20 with sufficient force to prevent the actuator 30 from raising the door 20 in the linear motion guides 26. As seen in FIG. 2, the door seal 36 can incorporate a door seal regulator 40 configured to regulate the pneumatic system 24 air pressure delivered to the door seal 36 to maintain the appropriate door seal 36 air pressure. The door seal 20 includes redundant air pressure sensors, a first door seal air pressure sensor 42 and a second door seal air pressure sensor 44.

A dual channel door switch 46 can be operatively coupled to the door 20 and provide a control signal 47 to a safety controller 48. The safety controller 48 can be configured as a programmable logic controller (PLC). The programmable logic controller is an industrial computer used to control different electro-mechanical processes for use in manufacturing, plants, or other automation environments. The safety controller 48 continuously monitors the state of input devices and makes decisions based upon a custom program to control the state of output devices. In an exemplary embodiment, the safety controller 48 can prevent or allow the process water 22 to energize/spray upon indication that the first door seal air pressure sensor 42 and the second door seal air pressure sensor 44 indicate the door seal 36 is sealed/inflated in addition to the dual channel door switch 46 indicating that the door 20 is properly positioned down closing the doorway 28. The redundancy in the instrumentation and controls of the safety controller 48 protects the operator from inadvertent energizing/actuation of the process water 22 with the door 20 improperly positioned. In a practical application, the hot water (up to 180 degrees Fahrenheit) cannot be sprayed in the washing zone 18 without the door being completely sealed and closed.

A clamp 50 can be utilized to hold a part 52, such as a blade. The clamp 50 can be pneumatic and include a clamp pressure regulator 51. The clamp 50 secures the part 52 inside the interior 14 proximate the washing zone 18. The clamp 50 includes internal passages 54 as seen in FIG. 2. The internal passages 54 are fluidly coupled to the process water 22, providing process water 22 to the internal cooling channels 56 of the part 52. Process water 22 is given access to the internal cooling channels 56 of the part 52 to remove unwanted debris and/or oil residue. The clamp 50 includes a rotary joint 58 that is configured to couple a rotary drive 60 with the clamp 50. The rotary drive 60 rotates the clamp 50 to allow for the part 52 to be exposed on all sides to a wash/air nozzle 62 located within the washing zone 18. The wash/air nozzle 62 is fluidly coupled to the process water 22 as well as the pneumatic system 24. The wash/air nozzle 62 can propel process water 22 at the external surfaces of the part 52 for removal of debris and oil residue. The wash/air nozzle 62 can propel air at the external surfaces of the part 52 for removal of water 22 debris and oil residue.

The process water 22 and pneumatic system 24 air use the same wash/air nozzle 62. Process water 22 and pneumatic system 24 air also share the same internal passage 54 to wash/dry the internal section 56 of the part. This sharing of internal and external plumbing is achieved with a series of high-volume check valves and solenoids. The wash/air nozzle 62 produces an excellent wash pattern with liquid in addition to the air.

The wash/air nozzle 62 can be fluidly coupled to the pneumatic system 24. The wash/air nozzle 62 is configured to direct high pressure air toward the part 52. The wash/air nozzle 62 can be configured as air knives. An air knife is a tool used to blow off liquid or debris from products as they travel on conveyors. Air knives are used in manufacturing parts drying, as part of component cleaning. The knife consists of a high-intensity, uniform sheet of laminar airflow. An industrial air knife is a pressurized air plenum containing a series of holes or continuous slots through which pressurized air exits in a laminar flow pattern. The exit air velocity then creates an impact air velocity onto the surface of the part 52. This impact air velocity can range from a gentle breeze to greater than Mach 0.6 (40,000 ft/min) to alter the surface of part 52 without mechanical contact. Air knives remove liquids, control the thickness of liquids, dry the surface, and remove foreign particles from the part 52 surfaces. Electrical currents from anti-static bars can also be injected into the exit air knife stream to neutralize the static electricity charge on some surfaces. Air knives can be stationary while the part 52 passes through the air velocity air stream. In other circumstances, the part 52 can be stationary and the air knives move (reciprocate or rotate) over the surface of the stationary part 52.

In an exemplary embodiment, the pneumatic system 24 air can also be fluidly coupled to the internal passage 54 of the clamp 50 and provide air to the cooling channels 56 of the part 52 to dry the part 52 interior.

The process water 22 can include deionized water 66. The process water 22 can be heated up to 180 degrees Fahrenheit with a heater 67. The process water 22 can include high temperature solenoids 68 and check valves 70, shown in FIG. 4, along with water pressure sensors 72 that provide instrumentation and controls inputs for the safety controller 48 and a process controller 74 to operate. The temperature solenoids 68 water pressure sensors 72 and check valves 70 can be installed with redundancy to prevent single failure loss of system control.

The cabinet 12 includes a water tank 76, as shown in FIG. 3. The water tank 76 serves to collect the process water 22. The water tank 76 can be double walled and insulated to provide operator protection and prevent unwanted heat transfer losses. The process water 22 can be operated from about 160 degrees Fahrenheit to about 180 degrees Fahrenheit. The tank 76 can include a rear section 78 and a forward section 80. The tank 76 is configured to flow process water 22 from the rear section 78 to the forward section 80. The process water 22 can be pumped from the forward section 80 into bottles 82, such as activated carbon bottles. The process water 22 can also be pumped into mixed bed resin bottles 84 to condition the water 22. An oil skimmer 86 can be located at the forward section 80. The oil skimmer 86 can process the captured oil into an oil coalescer 88 via an oil skimmer pump 90.

In an exemplary embodiment, the safety controller 48 and/or the process controller 74 can include data that may be transmitted to one or more processors 92 (e.g., computer systems having a central processing unit and memory) for recording, processing and storing the data received from sensors 42,44 and the like. Processor 92 may include a general-purpose processor, a digital signal processor (DSP), an application specific integrated circuit (ASIC), a field programmable gate array (FPGA) or other programmable logic device, discrete gate or transistor logic, discrete hardware components, or any combination thereof. Processor 92 may be in communication (such as electrical communication) with sensors 34, 44, 46 and the like and may be configured to receive input. Processor 92 may receive data 94 about the washer 10 captured and transmitted by the sensor(s) 34, 44, 46 and the like via a communication channel. Upon receiving the data 94, the processor 92 may process data 94 from sensors 34, 44, 46 and the like to determine if safe operating conditions are present in the washer 10.

The safety controller 48 is configured to monitor and control the safety functions of the washer 10. The safety controller 48 is configured to monitor and test safety related devices of the washer 10, including but not limited to low pressure conditions in the pneumatic system 24, safety valves 96 (dual monitored dump valves shown in FIG. 3); door switch 46, two hand no tie down 98 (a control that requires a machine operator to use both hands to actuate the washer 10, helping to insure that the operator's hands are not in a position to be injured by the washer 10); E-stop 100 (E-stop (emergency stop) is a simple, highly visible button designed to shut down operations on heavy and/or dangerous equipment. The E-stop 100 is used to save lives in industrial operations, E-stops shut down equipment immediately); process pressure 72, 102; process temperature, low air pressure and the like. The safety controller 48 along with the various sensors and components can be configured to satisfy a Category 3 Safety machine by use of SIL level 3 Safety Rated components.

The process controller 74 can be configured with a human machine interface (HMI) 104 providing the capacity to allow for engineering control of process parameters. The HMI 104 can display input and output signals 106 utilized for troubleshooting the washer 10. The HMI 104 can include alarm states 108 that can be indicated on the HMI 104. The process controller 74 can be configured to control the water temperature. The process controller 74 can utilize a proportional integral derivative (PID) controller 110 to regulate process variables. The PID controller 110 is an instrument used in industrial control applications to regulate temperature, flow, pressure, speed and other process variables. The PID 110 uses a control loop feedback mechanism to control process variables and is the most accurate and stable controller 110. The process controller 74 can also monitor and control the water conductivity of the process water 22. A UV light 112 can be utilized to control unwanted contamination in the process water 22, such as bacteria.

The disclosed washer includes a technical advantage includes improved system cycle time by 300%.

Another technical advantage of the disclosed washer includes cleaner parts.

Another technical advantage of the disclosed washer includes more reliable operation greatly reducing system down time.

Another technical advantage of the disclosed washer includes the capacity to quickly troubleshoot and maintain the washer.

Another technical advantage of the disclosed washer includes a device with Automation Level Category 3 level of safety.

There has been provided a high temperature washer. While the high temperature washer has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A washer comprising:

a cabinet defining an interior and an exterior; a washing zone within the cabinet interior; the cabinet having a doorway operatively coupled to said washing zone;

a door coupled to the exterior of the cabinet within linear motion guides coupled to the exterior, the door configured to open and close the doorway;

a door seal coupled to the cabinet exterior proximate the doorway and operatively coupled to the door for sealing the doorway, the door seal comprising an inflatable bladder fluidly coupled to a pneumatic air system;

a clamp located within the washing zone, the clamp configured to secure a part within the washing zone;

a wash/air nozzle located within the washing zone and fluidly coupled to a process water system, the wash nozzle configured to direct process water toward the part, the wash/air nozzle fluidly coupled to the pneumatic system, the wash/air nozzle configured to direct air toward the part;

a safety controller operatively coupled to the door, the pneumatic system and the process water system; and a process controller operatively coupled to the door, the pneumatic system, the process water system and the clamp, the process controller configured to wash the part.

2. The washer according to claim 1, wherein said clamp comprises internal passages fluidly coupled to the process water system and pneumatic system, wherein process water is fluidly coupled to internal channels of the part and pneumatic system air is fluidly coupled to the internal channels responsive to the safety controller and process controller.

3. The washer according to claim 1, wherein the clamp includes a rotary joint that is configured to couple a rotary drive with the clamp, the rotary drive configured to rotate the clamp such that the part is exposed on all sides to the wash nozzle located within the washing zone.

4. The washer according to claim 1, further comprising:

an actuator coupled to the door, the actuator fluidly coupled to the pneumatic system, wherein the actuator opens and closes the door; and a mechanical brake operatively coupled to the actuator, the mechanical brake configured to prevent the door from moving responsive to the safety controller.

5. The washer according to claim 1, further comprising:

air pressure sensors comprising a first door seal air pressure sensor and a second door seal air pressure sensor operatively coupled to the door seal, wherein the air pressure sensors are operatively coupled to the safety controller and configured to indicate door seal air pressure.

6. The washer according to claim 1, further comprising:

a dual channel door switch operatively coupled to the door, the dual channel door switch configured to provide a control signal to the safety controller and indicate door position.

7. The washer according to claim 1, further comprising:

a water tank located at the interior of the cabinet and fluidly coupled to the process water system and the washing zone; the water tank comprising an oil skimmer fluidly coupled to an oil coalescer.

8. A washer comprising: a cabinet with a washing zone accessible through a doorway; a door with an inflatable door seal for sealing the doorway, the door seal coupled to a pneumatic air system; a clamp for securing a part within the washing zone; a wash/air nozzle located within the washing zone and fluidly coupled to a process water system and a pneumatic system for washing and drying the part; a safety controller operatively coupled to the door, the pneumatic system and the process water system; and a process controller operatively coupled to the door, the pneumatic system, the process water system and the clamp, the process controller configured to wash the part.

9. The washer according to claim 8, wherein the clamp comprises internal passages fluidly coupled to the process water system and pneumatic system; and wherein the clamp includes a rotary joint that is configured to couple a rotary drive with the clamp.

10. The washer according to claim 8, further comprising:

an actuator coupled to the door, the actuator fluidly coupled to the pneumatic system, wherein the actuator opens and closes the door; and a mechanical brake operatively coupled to the actuator, the mechanical brake configured to prevent the door from moving responsive to the safety controller.

11. The washer according to claim 8, further comprising:

air pressure sensors comprising a first door seal air pressure sensor and a second door seal air pressure sensor operatively coupled to the door seal, wherein the air pressure sensors are operatively coupled to the safety controller and configured to indicate door seal air pressure.

12. The washer according to claim 8, further comprising:

a dual channel door switch operatively coupled to the door, the dual channel door switch configured to provide a control signal to the safety controller and indicate door position.

13. The washer according to claim 8, further comprising:

a water tank located at an interior of the cabinet and fluidly coupled to the process water system and the washing zone; the water tank comprising an oil skimmer fluidly coupled to an oil coalescer.

14. A process for washing a part with a washer comprising:

accessing a washing zone located within an interior of a cabinet of the washer:

securing a part to a clamp positioned within the washing zone;

closing a door over a doorway that accesses the washing zone;

securing the door with a door seal;

preventing the door from opening responsive to signals from air pressure sensors and a door switch;

washing the part with process water through at least one of a wash/air nozzle within the washing zone and internal passages within the clamp directed into internal channels of the part; and drying the part with air from a pneumatic system fluidly coupled to the wash/air nozzle directed toward the part and said internal passages within the clamp directed into the internal channels of the part.

15. The process of claim 14, further comprising:

securing the door in an open position employing a brake operatively coupled to an actuator coupled to the door and configured to lift the door open.

16. The process of claim 14, further comprising:

operatively coupling a safety controller to the door via the air pressure sensors and the door switch, the pneumatic system and the process water system; and operatively coupling a process controller to the door via the air pressure sensors and the door switch, the pneumatic system, the process water system and the clamp, the process controller configured to wash the part.

17. The process of claim 16, wherein the process controller is configured with a human machine interface providing engineering control of process parameters.

18. The process of claim 14, further comprising:

preventing the actuation of the wash nozzle responsive to failure of the door seal as indicated from at least one of the air pressure sensors and the door switch.

19. The process of claim 14, further comprising:

preventing the actuation of the air nozzle responsive to failure of the door seal as indicated from at least one of the air pressure sensors and the door switch.

20. The process of claim 14, further comprising:

fluidly coupling a water tank located at an interior of the cabinet to the process water system and the washing zone; and fluidly coupling the water tank comprising an oil skimmer to an oil coalescer.

* * * * *